April 26, 1927.
F. K. PLYMPTON
1,625,869
MACHINE FOR MAKING BOTTLE CLOSURES
Filed April 18, 1925 7 Sheets-Sheet 1
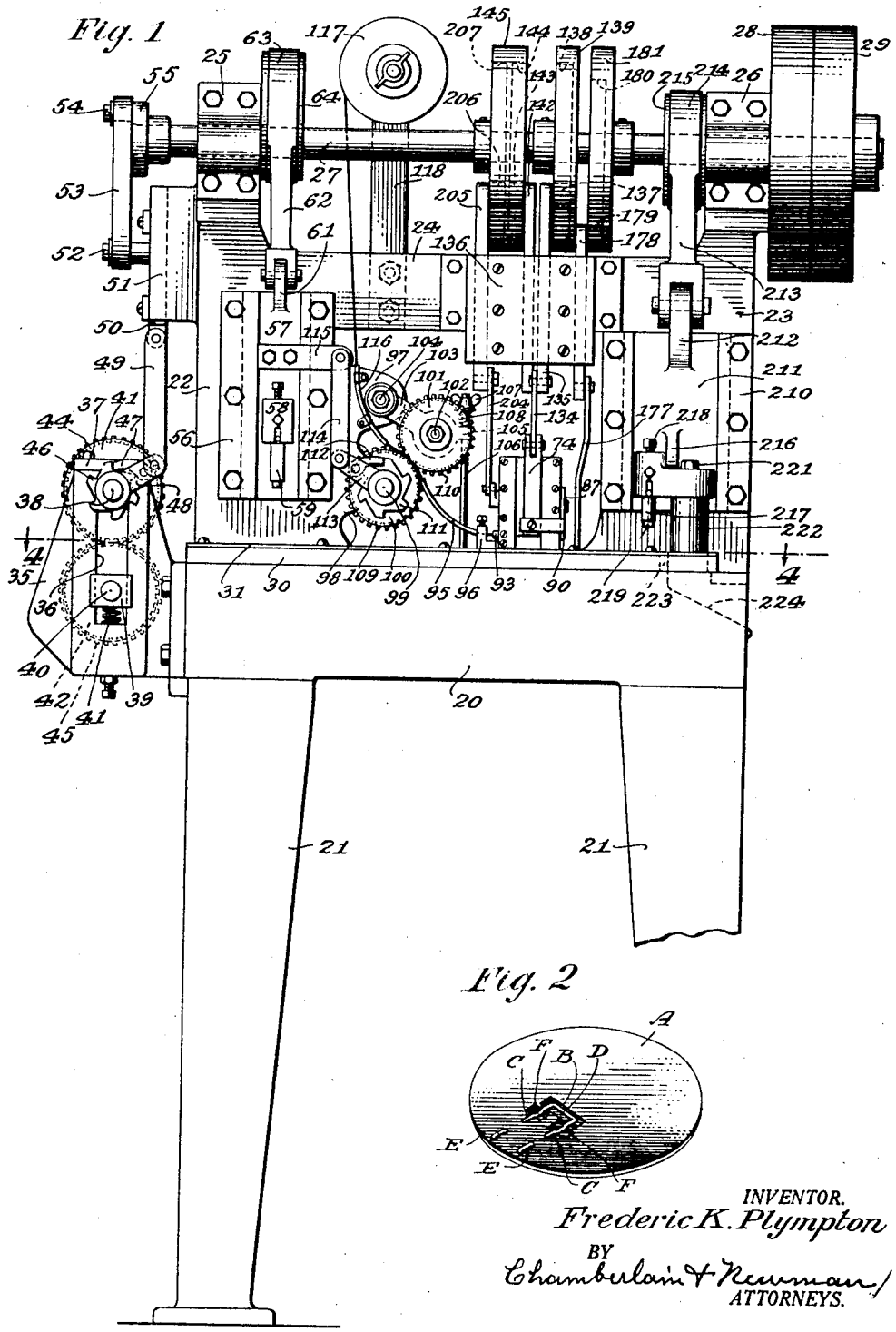
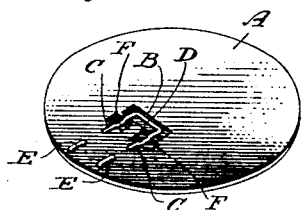
INVENTOR.
Frederic K. Plympton
BY
Chamberlain & Newman
ATTORNEYS.

April 26, 1927.

F. K. PLYMPTON 1,625,869

MACHINE FOR MAKING BOTTLE CLOSURES

Filed April 18, 1925

INVENTOR.
Frederic K. Plympton
BY
Chamberlain & Newman
ATTORNEYS.

April 26, 1927.

F. K. PLYMPTON 1,625,869

MACHINE FOR MAKING BOTTLE CLOSURES

Filed April 18, 1925   7 Sheets-Sheet 3

INVENTOR.
Frederic K. Plympton
BY
Chamberlain & Newman
ATTORNEYS.

April 26, 1927.  
F. K. PLYMPTON  
1,625,869  
MACHINE FOR MAKING BOTTLE CLOSURES  
Filed April 18, 1925 7 Sheets-Sheet 4
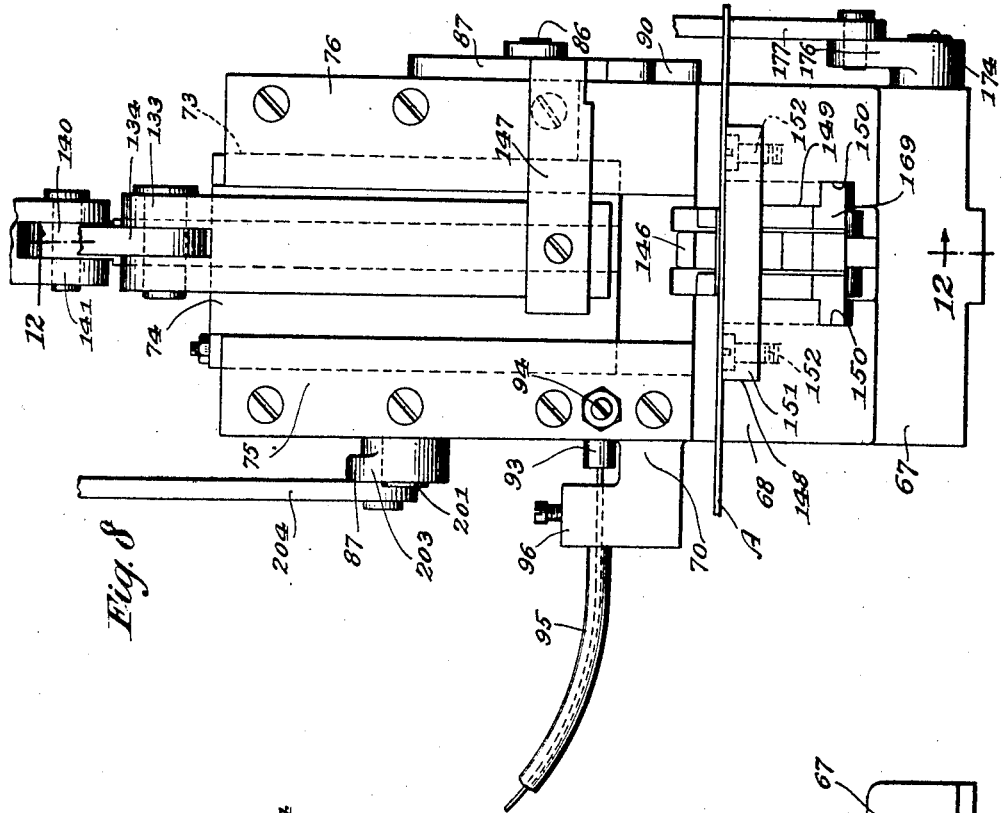
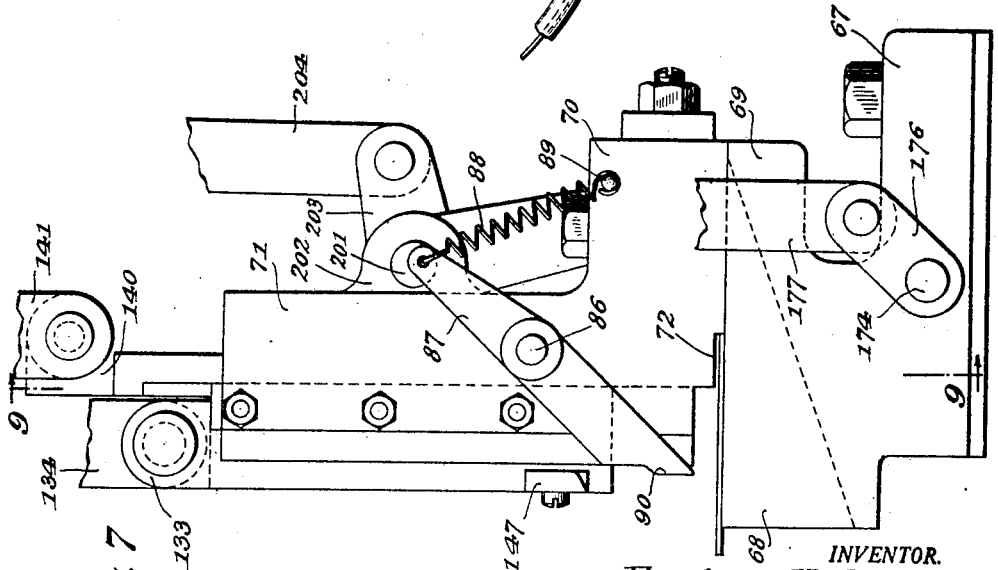
INVENTOR.  
*Frederic K. Plympton*  
BY  
*Chamberlain & Newman*  
ATTORNEYS.

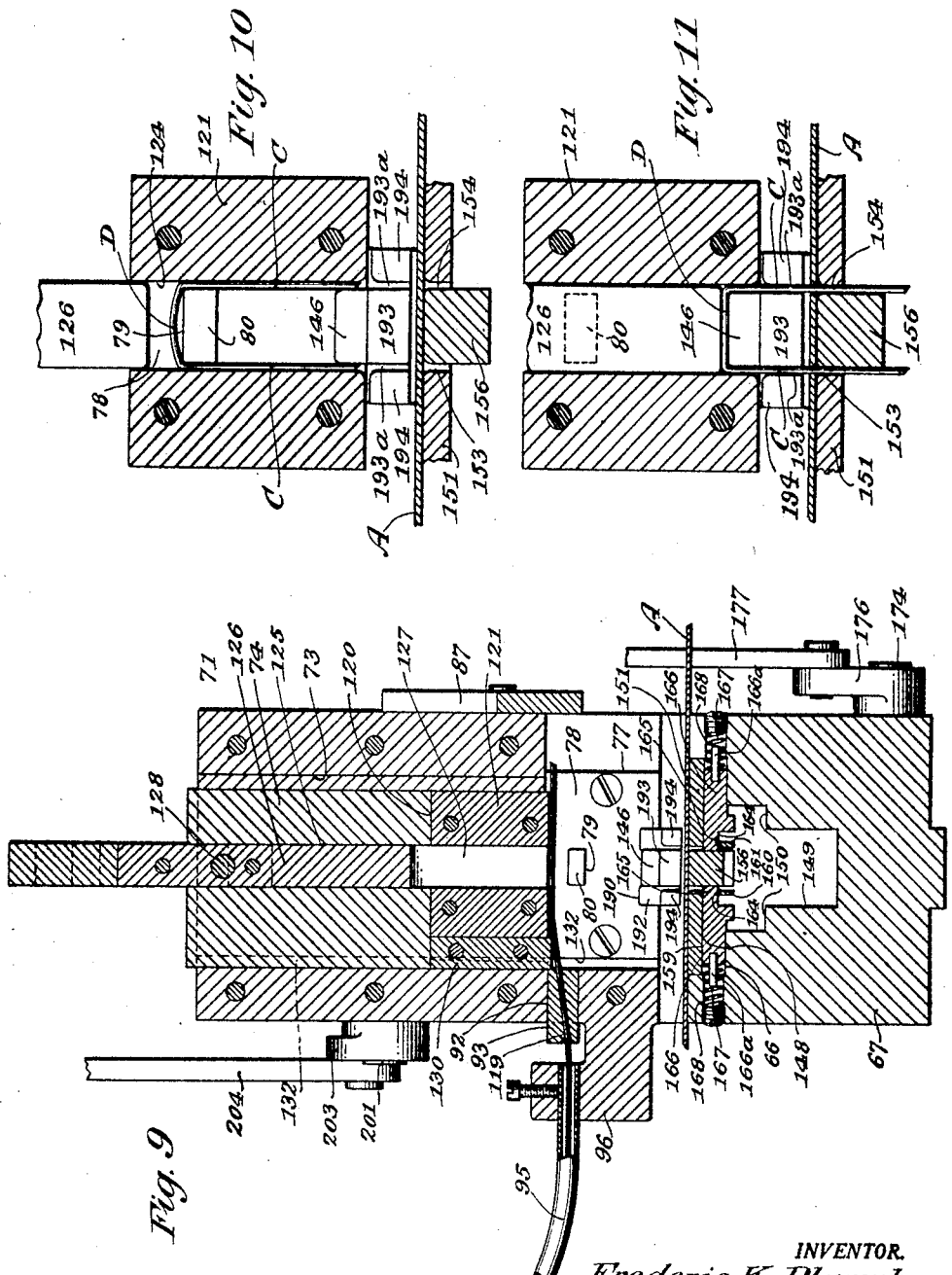

April 26, 1927.
F. K. PLYMPTON
1,625,869
MACHINE FOR MAKING BOTTLE CLOSURES
Filed April 18, 1925
7 Sheets-Sheet 6
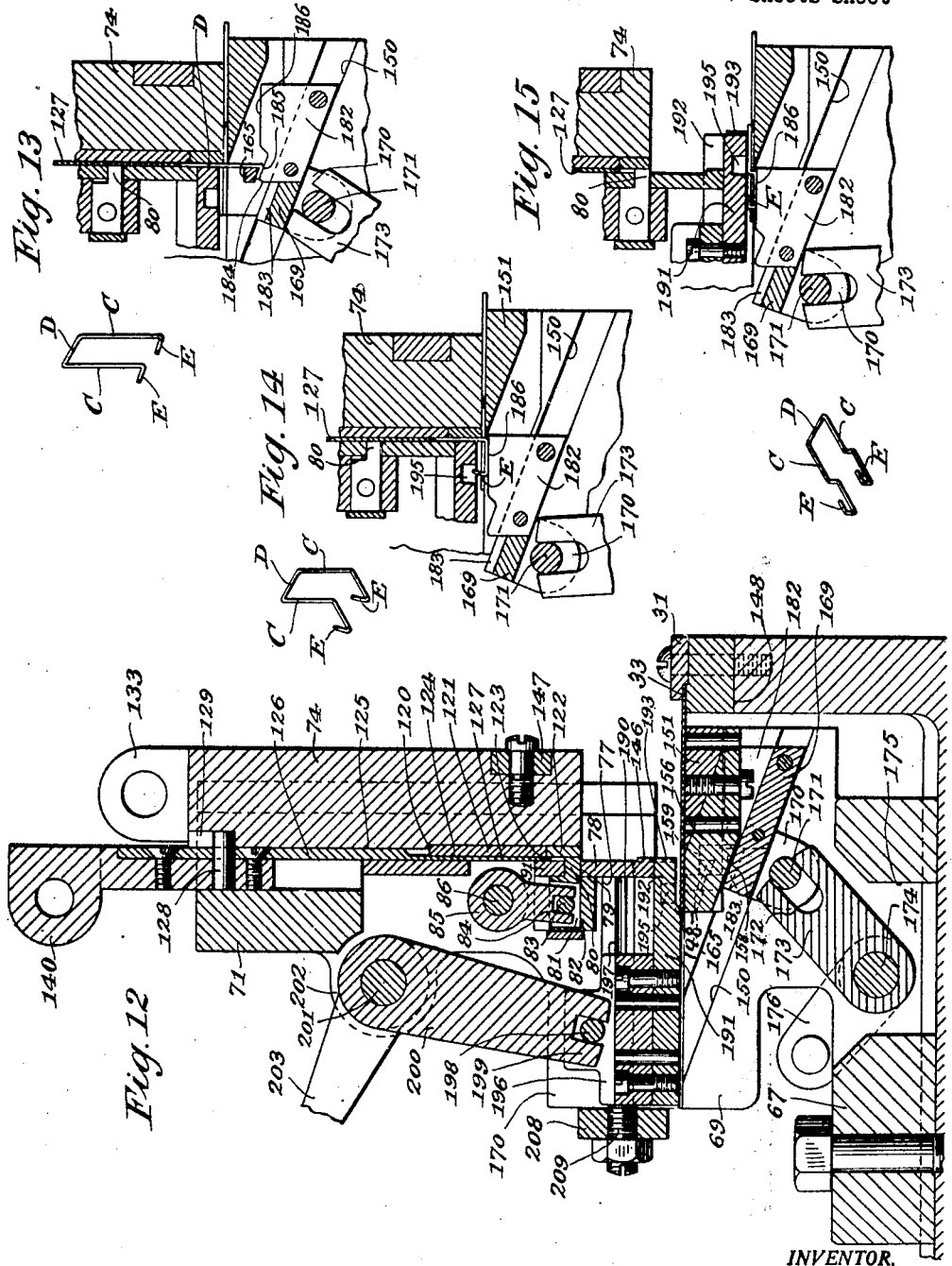
INVENTOR.
*Frederic K. Plympton*
BY
*Chamberlain + Newman*
ATTORNEYS.

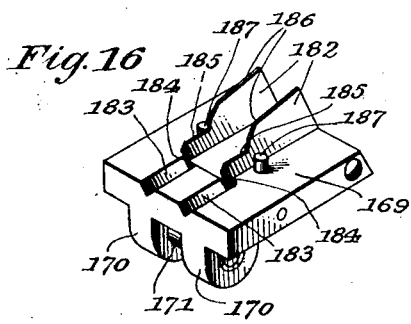
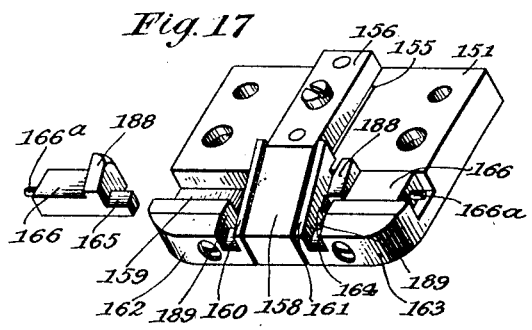
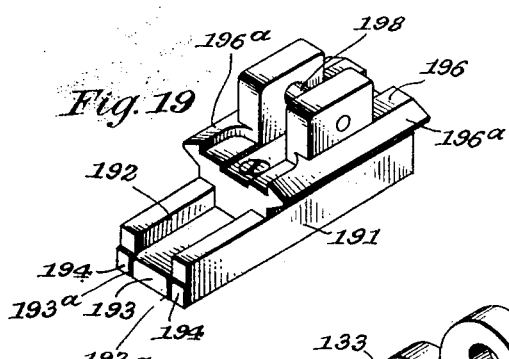
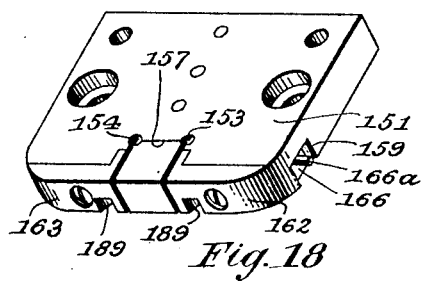
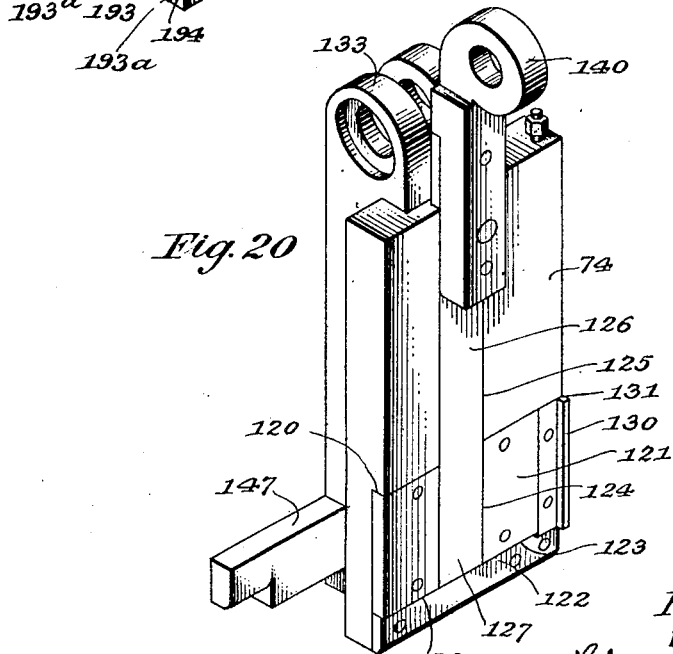
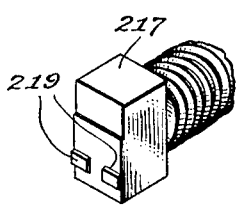

Patented Apr. 26, 1927.

1,625,869

UNITED STATES PATENT OFFICE.

FREDERIC K. PLYMPTON, OF BREWSTER, NEW YORK, ASSIGNOR TO NAOMI D. PLYMPTON, OF BREWSTER, NEW YORK.

MACHINE FOR MAKING BOTTLE CLOSURES.

Application filed April 18, 1925. Serial No. 24,301.

The present invention relates to a machine for making closure disks or caps, and particularly such caps having a wire bail or lift secured thereto, an object being to provide an automatic machine into which a strip of paper or cardboard stock, or the like, is fed, and in which wire forming and attaching mechanism is adapted to provide each cap length of the strip with the wire bail or lift; and further to provide means for imbedding and impressing the wire bail in a manner to provide a substantially flat finished cap, which at the same time will permit the bail to be bent with facility into upright position for the purpose of extracting the cap from the bottle or the like into which it is adapted to be fitted.

A further object is to provide a machine, in which the feeding, forming, impressing and blanking operations are synchronized and carried on in a manner to enable the rapid, continuous, and reliable production of the caps.

Another object is to provide an improved wire forming and attaching mechanism, and particularly one in which the wire is formed into bail-shape, forced through the cap strip to the underside, bent upon the underside, and forced upwardly through the strip against, and finally clinched at the ends and flattened at the bail portion, to provide a flat cap structure in which the bail is securely attached in spaced relation to the periphery of the cap.

The more general principles of the invention are applicable in various forms to machines adapted for the manufacture of closure disks or caps, and other articles, having attachments varying in respect to the foregoing details.

The machine more especially comprises mechanism adapted for the production of closure disks having a wire bail attachment, somewhat similar to that shown in the U. S. patent to Moak, 1,361,394 of December 7, 1920, with the novel feature, however, of passing the ends of the wire through the cap stock a second time to form clinching ends at the upper surface in spaced relation to the periphery of the cap, and the further novel features of indenting the cap stock and impressing the side legs of the bail to throw up the transverse portion, which is disposed in the indentation formed in the cap, to provide a flat cap, capable of being stacked and used in a capping machine, and in which the bail may be readily lifted.

With the above and other objects in view, an embodiment of the invention is shown in the accompanying drawings, and this embodiment will be hereinafter more fully described with reference thereto, and the invention will be finally pointed out in the claims.

In the drawings:—

Fig. 1 is a front elevation of my improved cap forming machine;

Fig. 2 is a perspective view of a cap or disk made by the machine, as shown in Fig. 1, and provided with an attached bail or lift;

Fig. 7 shows an enlarged side elevation of the wire forming and attaching unit or mechanism;

Fig. 8 is a front elevation of the unit shown in Fig. 7;

Fig. 9 is a vertical sectional view of the wire forming and attaching unit, taken along the line 9—9 of Fig. 7;

Fig. 10 is an enlarged vertical sectional view of the lower end of the wire forming mechanism, and showing the wire bent into inverted U-shape;

Fig. 11 is a similar view, and showing the wire forced through the paper strip;

Fig. 12 is a central vertical sectional view of the wire forming and attaching unit, taken along the line 12—12 of Fig. 8;

Figs. 13, 14 and 15 are sectional views of the wire forming and attaching tools, shown in Fig. 12, and illustrating different positions of said tools and the several steps in the formation of the wire, the perspective views in relation to each of these figures showing the wire as formed;

Fig. 16 is a perspective view showing the upper side of the wire forming slide operative beneath the paper strip;

Fig. 17 is a perspective view of the under side of the former plate disposed beneath the paper strip, and with which the slide shown in Fig. 16 cooperates;

Fig. 18 is a perspective view of the upper side thereof;

Fig. 19 is a perspective view of the wire end-clinching and bending horizontal slide operative above the paper strip;

Fig. 20 is a perspective view of the vertical slide for initially cutting off and forming the wire into inverted U-shape;

Fig. 21 is a perspective view of the punch for impressing the sides of the formed and attached wire bale to throw up the transverse portion thereof;

Similar reference characters indicate corresponding parts throughout the several figures of the drawings.

Figure 3:
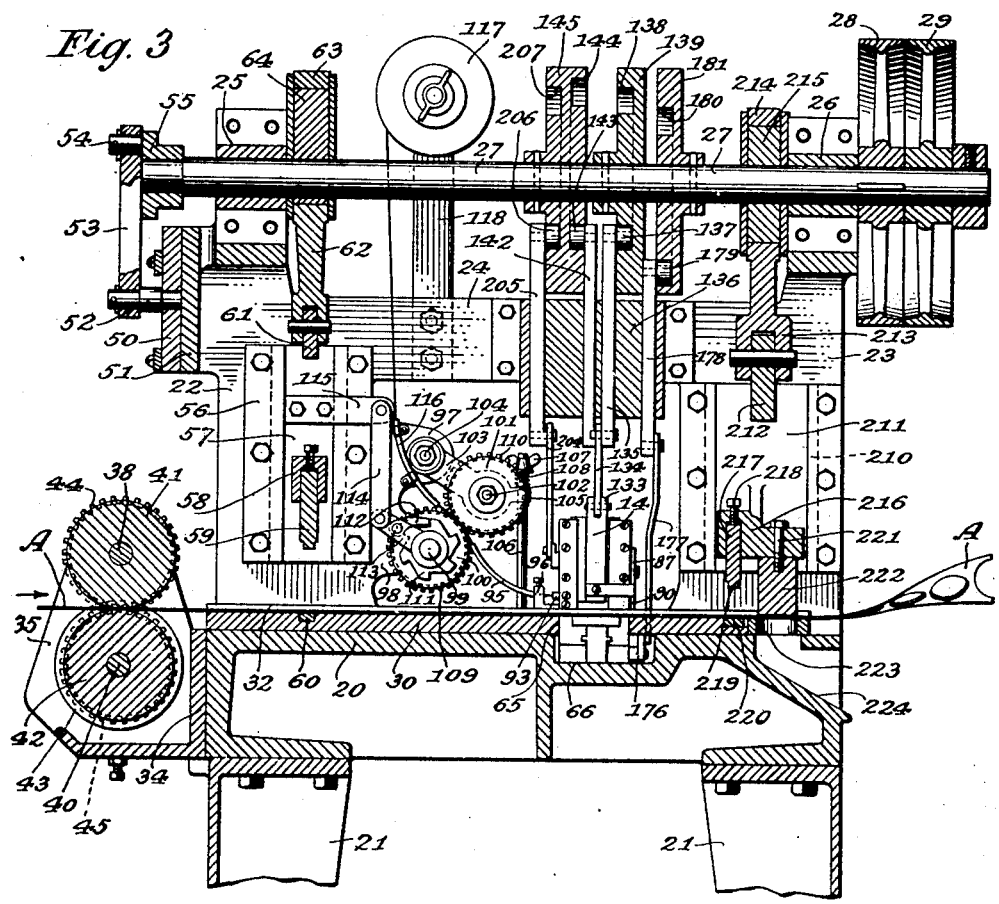
Fig. 3 is a central vertical longitudinal sectional view, taken along the line of movement of the paper strip, and showing the tools and mechanisms for operating on the same.
Figure 4:
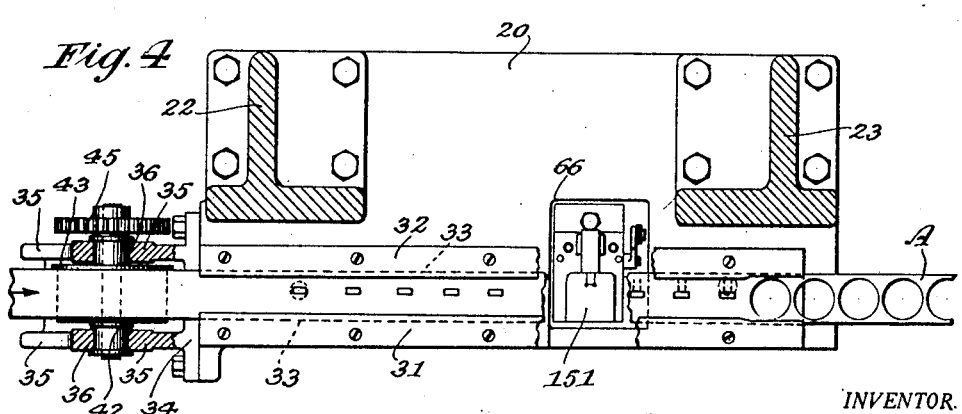
Fig. 4 is a sectional plan view of the bed of the machine, taken on the line 4—4 of Fig. 1.
Figure 5:
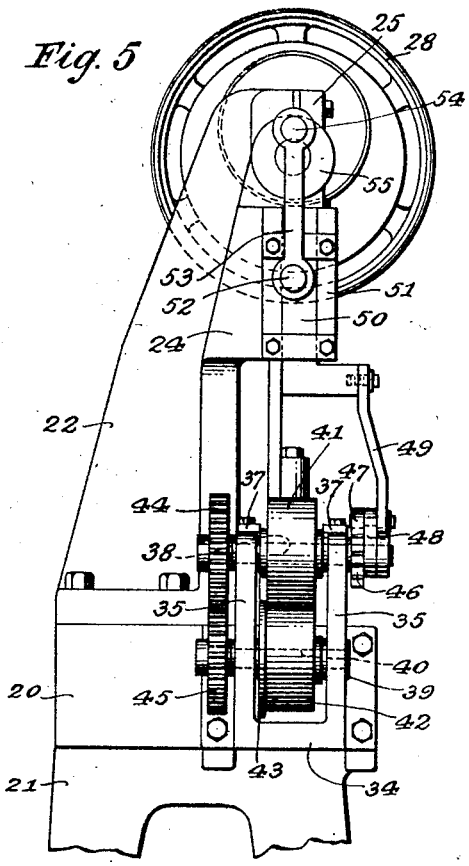
Fig. 5 shows an end elevation of one end of the machine, with the legs broken away.
Figure 6:
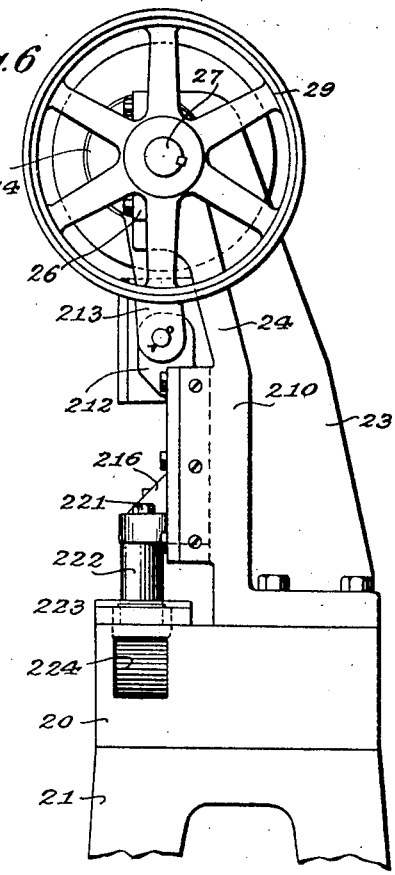
Fig. 6 is a similar end elevation of the opposite end of the machine.

Referring to the drawings and more particularly to Figs. 1 to 6 thereof, the machine, according to the present embodiment of the invention, comprises a horizontal bed plate 20 mounted upon suitable legs 21, and having mounted at its upper side a frame consisting of end standards 22 and 23, bolted at their bases to the bed plate at each end and adjacent the rear edge thereof, and having a transverse connecting portion 24 disposed in spaced and parallel relation above the bed plate. At each end of the frame there are provided upwardly extending bearing projections 25 and 26, in which is journaled a horizontal cam and drive shaft 27 provided at one end with tight and loose pulleys 28 and 29 for driving the shaft by means of a suitable belt.

Adjacent the forward edge of the bed plate there is mounted a longitudinal guide through which the paper strip, from which the caps are adapted to be punched, is intermittently fed, and consisting of a base portion 30 and upper edge guiding strips 31 and 32 secured adjacent each longer edge of the base portion 30 and under-cut, as at 33 (Figs. 4 and 12), to receive and retain the edge of the paper strip A.

At one end of the bed plate there is mounted a bracket 34 having a pair of spaced vertical upright sides 35 having vertically disposed slots 36 open at their upper ends and within which there are secured the upper fixed bearings 37 of an upper shaft 38 and the lower movable bearings 39 of a lower shaft 40, said bearings 39 being pressed upwardly by means of springs 41ª interposed between the lower ends of the slots 36 and said bearings. The shafts 38 and 40 are respectively provided with feed rollers 41 and 42, the latter having a flange 43 at one edge which overlaps the periphery of the upper roller at one side. The paper strip is adapted to be fed between these rollers, and the construction is such that the lower roller is pressed continuously toward the upper roller and therefore grips the strip to impart positive feeding movements thereto as the rollers are intermittently rotated, as will presently more fully appear.

At the inner ends of the shafts 38 and 40 there are mounted gears 44 and 45, which are of equal size and mesh with each other, so that the rollers are adapted to be simultaneously driven at equal surface speeds. At the outer end of the upper shaft 38 there is mounted a ratchet 46 engaged by a pawl 47 pivotally mounted upon a lever 48 rotatably engaged upon the end of the shaft 38, and which lever is pivotally connected to one end of a lever 49 which is pivotally connected at its other end to the lower end of a reciprocating slide 50 mounted in a slideway 51 secured to the side of the standard 22, said slide being provided with a projecting stud 52, upon which is pivotally engaged one end of a crank arm 53 which is pivotally connected at its other end to the stud 54 of an eccentric 55 mounted upon the end of the shaft 27. It is obvious that through rotation of the shaft 27 the slide 50 is reciprocated, and during the upward movements of such reciprocation, the pawl 47 rotates the ratchet 46 through a partial revolution, while through the downward movements of such reciprocation the pawl rides over the ratchet to engage the next tooth, the paper strip being thereby intermittently fed through the machine.

Figure 22:
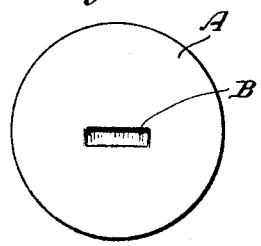
Figs. 22, 23 and 24 (Sheet 3) are plan views showing the cap in various stages of its formation.
Figure 23:
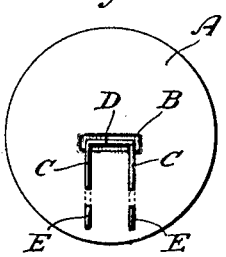
Figure 24:
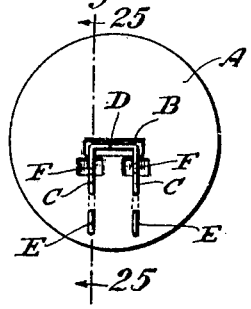

Upon the forward side of the standard 22 there is secured a vertical slideway 56, in which a slide 57 is mounted for vertical reciprocation, this slide having secured in a suitable bracket 58 mounted thereon a punch 59, adapted as the slide moves downwardly to produce a slight impression B in the upper surface of the paper strip, the strip being supported beneath the point at which said impression is produced by means of a hardened block 60. This impression, as shown in Fig. 22, is for the purpose of receiving a slightly raised wire bail or lift so that it is substantially flush with the surface of the cap, for facilitating stacking of the caps and their use in automatic capping machines.

The slide 57 is provided at its upper end with an apertured lug 61 to which is pivotally connected the lower end of the arm 62 of a ring 63 engaged upon an eccentric 64 secured to the shaft 27, and through which the slide is adapted to be reciprocated in synchronism with the feeding movements of the paper strip, so that in the interval between each movement of the strip the punch 59 engages and impresses the same.

The slide 57 is also adapted to operate the feed mechanism for the wire from which the wire bales or lifts are produced, but inasmuch as this mechanism works in conjunction with the wire forming and attaching mechanism its description will be deferred and included in the description of such forming and attaching mechanism.

At one point intermediate the ends of the slideway 30 there is provided an opening 65 in which the base portion of the wire forming and attaching mechanism is inserted in such relation that the paper strip passes over such portion, and in the bed plate there is formed in registry with the opening 65 a pocket 66 in which said base portion is also disposed.

The base portion of the wire forming mechanism consists of a lower horizontal part 67 bolted into said pocket 66 and an upper portion 68 having its forward part disposed in the opening 65, its upper surface being flush with the upper surface of the guideway 30 so that the paper strip moves over said forward part. A rearwardly projecting portion 69 is provided adjacent the right hand edge of the portion 68 and is adapted to mount the base 70 of a vertically disposed support 71 for the wire forming mechanism which is disposed above the paper strip being fed, the support being provided at its lower forward edge with a recess 72 through which the rearward edge of the paper strip is adapted to feed. The support 71 is provided in its forward face with a vertical slideway 73 in which a slide 74 is mounted for vertical reciprocatory movement, and is retained by means of gib plates 75 and 76 secured at each side of the slideway. Within a recess 77 (Figs. 9 and 12) formed in the lower end of the rearward face of the slideway 73, there is secured a flush plate 78 provided with a rectangular horizontally extending passage 79 in which is slidably engaged the forward rectangular anvil end 80 of a slide member 81 arranged for horizontal sliding movement in a bracket 82 secured to the rearward face of the plate 78. The member 80 is slotted and provided with a transverse pin 83 which is engaged by the forked end 84 of a rock lever 85 mounted upon a rock shaft 86 having bearing in the support 71 and provided at one projecting end with a lever arm 87 (Fig. 7). The lever arm is diagonally disposed and at its upper end is connected to one end of a spring 88, the other end of which is tied at 89 upon the base 70 of the support, and at its lower end the lever is provided with a projecting cam portion 90 which projects with relation to the forward surface of the gib plate 76. It is to be noted that the spring 88 normally tends to draw the lever 87 in clockwise direction, which causes the anvil end 80 of the slide 81 to be projected forwardly relatively to the surface of the flush plate 78 being limited in such forwardly projected position by the shoulder 91 formed on the slide which abuts the rearward surface of the flush plate. This anvil in its projected position constitutes a former about which the wire is adapted to be bent into inverted U-shape, the same adapted to be retracted into flush relation with the flush plate through engagement of means, hereinafter more fully described, with the camming end 90 of the lever 87, to permit downward driving of the formed wire.

The wire is adapted to be fed transversely across the slideway above the anvil 80 and for this purpose there is provided at one side of the slideway in a suitable cut-out 92, (Fig. 9), an apertured wire guiding block 93 adjustably secured in said cut-out by means of a set screw 94, the wire being fed into the aperture of said block from a wire guiding tube 95 secured at its lower end in a bracket projection 96 formed upon the support 71, the upper end of the wire guide tube extends into relation with the wire feeding mechanism which is adapted to intermittently feed the wire through the tube, the successive lengths of wire for forming the wire bails or lifts being intermittently severed within the forming mechanisms by means hereinafter more fully referred to.

The wire feeding mechanism (Figs. 1 and 3) is mounted upon bracket projections 97 and 98 formed upon the inner side of the standard 22 and in the lower projection 98 there is supported a shaft 99 upon which there is rotatably mounted a wire feed roller 100 which cooperates with another wire feed roller 101 rotatably supported at 102 upon the end of a lever 103 pivotally mounted at 104 in the upper bracket projection 97. The lever 103 is provided at its end with an apertured projection 105 through which a vertical rod 106 extends, said rod being provided at its upper end with a winged nut 107 between which and the projection 105 there is provided upon the rod a spring 108 which is adapted to press the upper feed roller 101 toward the roller 100 so as to insure the positive feed of the wire. The respective shafts 99 and 102 of the rollers are provided with gears 109 and 110, respectively, which are of equal size and mesh with each other so that the rollers are rotated at equal surface speed. Upon the shaft 99 there is secured a ratchet 111 which is engaged by a pawl 112 pivotally supported upon a lever 113, rotatably mounted at one end upon the shaft 99, and having its other end pivotally connected to one end of a link 114, the other end of which is pivotally connected to a bar 115 secured to the reciprocating slide 57. It is obvious that the reciprocation of the slide 57 causes intermittent feeding movement to be imparted to the feed rolls. In passing between the feed rolls the wire is fed from a guide tube 116 secured to the bracket 97, and to which the wire is fed from a supply roll 117 mounted upon a support 118 secured to the frame 24.

The passage 119 through the wire guide block 93 is inclined as shown in Fig. 9, so that as the wire emerges therefrom it is at an angle to a horizontal line with respect to the vertical inner surface of the block 93 so that when the length of wire is sheared off the ends of the wire are slightly pointed, and may more readily be forced through the paper strip, as will more fully hereinafter appear. It will also be apparent that due to the angular position of the hole through the die block with respect to the pocket into which the wire is positioned, the wire is disposed against and guided along one side of the forming tools in a way to form a perfectly straight blank, without the use of straightening rolls.

The slide 72 is provided at its lower end with a transverse recess 120 (Fig. 20) in which there is secured a plate 121, the lower edge of which terminates in spaced relation to the lower edge of the slide, and within the recess and abutting said lower edge of the plate there is secured a strip 122, the surface of which is in-set with relation to the surface of the plate 121 so that shoulders 123 are formed at the lower edge of said plate 121. In the raised position of the slide 74 these shoulders 123 are in spaced relation above the projected anvil 80 (Fig. 12) which is projected into engagement with the surface of the strip 122 so that a passage is provided between the anvil and the shoulders through which the wire is adapted to feed, the same moving first at an angle into engagement with the shoulders and then being guided into horizontal relation as shown in Fig. 9. The plate 121 is provided with a vertical slot or recess 124, the surface of which is flush with the surface of the strip 122, the width of the recess being slightly greater at each side than that of the anvil 80. The slide is provided in alignment with the recess 124 with a slot 125, corresponding in width to the recess but of slightly greater depth, and within this slot there is engaged a slide member 126 provided at its lower end with a relatively thin portion 127 for engagement in the recess 124, the exposed surface of the slide 126 being flush with the surfaces of the slide 74 of the plate 121.

The downward movement of the slide 126 is limited relatively to the slide 174 by means of a pin 128 engaged in a slot 129 provided in the slide 74, the end 127 of the slide 126 being in line with the shoulders 123 in such relation, so that a substantially continuous shoulder is formed as shown in Fig. 9 and along which the wire is fed.

The slide 74 is provided adjacent one edge with a shearing knife 130, adjustably secured in a suitable recess 131, the cutting edge projecting relatively to the inner surface of the slide 74 and being engaged in a groove 132 formed adjacent one side wall of the slideway 73.

The slides 74 and 126 are adapted to be independently reciprocated, and for this purpose the slide 74 is provided at its upper end with apertured bearing lugs 133 to which there is pivotally connected the lower end of a link 134 connected at its upper end to a slide 135 mounted for vertical reciprocatory movement in a slide fixture 136 secured to the frame 24, the upper end of said slide being provided with a roller 137 which engages a cam groove 138 of a cam 139 mounted upon the shaft 27, and adapted during the rotation of the shaft 27 to reciprocate the slide 135, the diagram of the cam being such as to impart the desired and properly timed movements to the slide 74 as will hereinafter appear. The slide 126 is similarly provided with an apertured lug 140 to which there is pivotally connected the lower end of a link 141 connected at its upper end to a slide 142 adapted to have reciprocatory movement in the fixture 136, and provided at its upper end with a roller 143 which engages the cam groove 144 of a cam 145 mounted upon the shaft 27.

The operation of the slides 74 and 126 is as follows:—

The starting position is shown in Figs. 9 and 12, with the shoulders 123 and the lower end 127 of the slide 126 in aligned relation with each other and in spaced relation to the projected anvil 80. The slide 74 first moves downwardly, during which movement the knife 130 severs the projected length of wire, which emerging at an inclination to a horizontal line is pointed as above pointed out, the severed wire being confined during this initial movement of the slide by the surface of the strip 122 which moves in contact with the projected end of the anvil 80. The slide continues to move downwardly to the position indicated in Fig. 10 causing the wire to be bent downwardly at its ends about the sides of the anvil 80 into inverted U-shape, the bent down ends C—C being confined in vertical position by abutting against a rectangular projection 146 formed at the lower edge of the plate 78 in spaced and aligned relation to the anvil 80. The ends of the wire legs are thus driven down through the guideway 193ª in a manner to puncture the paper strip at a right angle. As the slide approaches the end of its downward movement a transversely disposed bar 147, secured upon its forward side and projecting over the gib plate 76, engages the projecting cam end 90 of the lever 87 rotating the lever in counter-clockwise direction, causing the anvil 80 to be retracted into flush relation with the plate 78, so that the formed wire is free to be pressed downwardly and through the paper strip. This is brought about by the slide 126, which moves downwardly after retraction of the anvil 80, and forces the vertical sides of the formed wire partially through the paper strip, the transverse portion D of the wire being retained in spaced relation to the upper surface of the paper strip by engagement with the projection 146, this transverse portion D of the wire being furthermore straightened out by being pressed against the upper surface of said projection by the lower end of the slide 126. The wire is now in a vertically disposed position with its side legs partially engaged through the paper strip, and its upper portion is held in such relation during further forming operations upon the wire which take place below the paper strip.

The upper portion 68 of the base is provided adjacent its forward edge with a rectangular pocket 148, the base being further provided with a transverse opening 149 disposed centrally of the pocket and extending from the front to the rear edges of the base, the side walls of this opening being provided with opposed slideways 150 inclined downwardly from the rear edge of the base to the front edge. Within the pocket 148 there is provided a flush plate 151 (Figs. 17 and 18) secured in the pocket by screws 152 (Fig. 8) and provided in spaced relation to its rear edge with vertical passages 153 and 154 into which the ends of the wire which have been forced through the paper strip are engaged as shown in Fig. 11. The plate 151 is provided at its underside with a transverse slot 155 disposed centrally thereof and inclined in parallel relation to the slideways 150 and within this slot there is secured a block member 156 having its vertical side walls spaced from the side walls of the slot 155 and thereby forming inclined slideways which extend to the upper surface of the plate, the forward end of the block being disposed within a cut-out 157 of the plate and being flush with the upper surface thereof, while the underside of the block adjacent its forward end is inclined as at 158 in parallel relation to the slideways.

The plate 151 is further provided at its under-side with a longitudinal channel 159 disposed adjacent the rearward edge and extending at each side of the block 158 to the ends of the plate. At each side of the inclined portion 158 of the block 156 there are provided plates 160 and 161, extending across the channel 159 and disposed in spaced and parallel relation to the sides of said block, the inner surfaces of said plates being flush with the side walls of the slot 155 and forming in effect a continuation of said side walls. The plates 160 and 161 have attaching portions 162 and 163 respectively which are screwed to the rearward surface of the plate 151 at each side.

The plates 160 and 161 are each provided within the channel 159 with an opening 164 within which there is engaged an anvil portion 165 of a slide block 166 engaged within the channel and adapted to have reciprocatory movement therein. The anvil portions are adapted to be pressed against the side walls of the block 156, to form supports within the slots about which the ends of the wire are adapted to be bent, by means presently to be described, and are adapted to be withdrawn from the slots to permit further bending of the wire. For this purpose each of the anvil slides 166 is provided at its outer end with a pin 166ª, about which there are respectively engaged springs 167 disposed in pockets 168 formed in the base plate at each side of the plate 151, and adapted to normally press said slides inwardly to engage their anvil ends with the sides of the block 156, as shown in Fig. 9. The side legs of the wire as they are forced downwardly through the paper strip are engaged in the slots at each side of the block 156 and at one side of the anvil portions 165.

Within the slideways 150 there is slidably engaged a slide block 169 (Fig. 16) provided at its underside with spaced lugs 170 supporting a transverse pin 171 which is engaged by the forked end 172 (Fig. 12) of a crank lever 173 mounted upon a rock shaft 174 journaled in a suitable opening 175 of the base plate 67, and upon one end of said shaft there is secured a lever 176, which is pivotally connected at the lower end of a link 177 pivotally connected at its upper end to a slide 178 mounted in the slide fixture 136 and provided at its upper end with a roller 179 engaged in the cam groove 180 of a cam 181 mounted upon the cam shaft 27.

The slide block 169 has secured in it a pair of vertically disposed parallel blades 182 adapted to engage the slideways provided at each side of the block 156 of the plate 151, the surface of the slide block 169 between the blades 182 adapted to have sliding bearing upon the inclined surface 158 of said block 156. The blades 182 extend from one end of the slide block to a point in spaced relation to the other end, and adjacent said latter ends. The block is grooved as at 183 to provide spaces in which the ends of the wires are engaged in the forwardly projected position of the slide as shown in Fig.

12. It will be noted from Fig. 12 that the underside of the anvils are inclined in parallel and spaced relation to the slide 169. The operative edges of the blades 182 consist of a vertical inner end portion 184, an upper flat portion 185 parallel to the surface of the slide and adapted to move beneath the anvil in slightly spaced relation thereto, and an upwardly extending portion 186 curved adjacent the portion 185 and horizontal from said curved portion to the outer ends, said outer ends extending into nearly contacting relation with the slideways of the plate 151. As the slide starts its upward movement, the first action is to engage the vertical portions 184 of the blades with the ends of the wires projecting below the anvils 165, the continued upward movement causing such ends E E to be bent beneath said anvils in upwardly inclined relation, as shown in Fig. 13. The anvils are now adapted to be withdrawn to permit upward bending of the wires, and for this purpose the slide is provided at each side with pins 187 which are adapted to engage camming portions 188 provided upon the anvil slides 166, the engagement of the pins with such portions causing the anvils to be withdrawn so that the wires are free to be bent upwardly. The plate 151 and the attaching portions 162 and 163 of the plates 160 and 161 are provided with grooved portions 189 in which the pins 187 are adapted to move as the slide approaches its upward movement and after the pins have been released from engagement with the camming portions 188.

Figure 25:
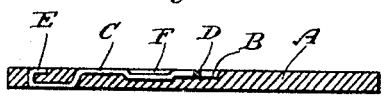
Fig. 25 is a sectional view of the completed cap, taken along the line 25—25 of Fig. 24.

As the slide continues its upward movement the portions 186 of the blades bend the ends of the wire upwardly and cause the bent over ends E of the same to be projected upwardly through the paper strip as shown in Fig. 14, the portion of the wire legs beneath the paper strip being flattened against the same and imbedded by the force of the blades 182 as shown in Fig. 25.

The base 70 of the wire forming and attaching support 71 is provided with a transverse passage 190, within which there is slidably engaged a slide bar 191 (Figs. 12 and 19) the forward end 192 of which is U-shape in cross section and is disposed below and at each side of the projection 146 of the plate 78, and about which the upper portion of the wire is held during the bending of the lower portion as just described, the forward end of said slide being furthermore provided with a projecting portion 193 of corresponding width to the portion 146 and having its surface flush with it in the retracted position of the slide, and at the lower edge of the slide and at each side of the projection 193 there are formed lugs 194 spaced from said projection to provide guide-ways for the wire, the end of the slide thus cooperating with the projection 149 to securely support the upper portion of the wire. At the under side of the slide there are formed pockets 195 into which the bent ends E of the wire, forced upwardly through the paper strip, are engaged.

The slide 191 is provided at its rearward portion with a slide block 196 having side flanges 196ª slidable in suitable slide grooves 197 of the base, said slide being further provided with a transverse pin 198 which is engaged by the forked end 199 of a rock lever 200 mounted upon a rock shaft 201 journaled in suitable bearing portions 202 of the support, said lever being provided with a bell crank extension 203, to which is pivotally connected the lower end of a link 204 pivotally connected at its upper end to a slide 205 mounted for reciprocation in the slide fixture 136, said slide being provided at its upper end with a roller 206 which is engaged in the cam groove 207 formed in one side of the cam 145 mounted upon the shaft 27. A removable cross bar 208 is secured by bolts across the rearward end of the slide-way 197 and is provided within said slideway with an adjustable set screw 209 to limit the rearward position of the slide.

As shown in Fig. 14 the wire has its upper portion vertically disposed and supported about the projection 146 by means of the upper forming slides, and has its lower portion bent upwardly into engagement with the under side of the paper strip with the bent ends E forced through the strip, the same being supported in such position by the upper flat surfaces 186 of the blades 182. At this point the slides 74 and 126 are moved upwardly as shown in Fig. 15 and the horizontal slide 191 is projected forwardly, its forward end bending over the upper portion of the wire into flat relation upon the upper surface of the paper strip, and at the same time the pockets 195 engage the bent ends E of the wire and clinch them over upon the strip, the force of the slide imbedding these portions into the paper strip, as shown in Fig. 25.

As the slide 191 recedes the paper strip feeding mechanism operates to feed the strip forwardly a distance corresponding to one cap, bringing the next portion of the strip into place to have the wire bail or lift inserted therein.

Upon the forward side of the standard 23 there is provided a slideway 210 in which there is mounted for vertical reciprocation a slide 211 provided at its upper portion with a lug 212 to which there is pivotally connected the forked end of an arm 213 provided upon a ring 214 rotatably mounted upon an eccentric roller 215 secured to the shaft 27, and adapted to reciprocate the slide 211 in synchronism to the other operative parts of the machine. The slide is provided with a projecting support 216 in one side of which there is supported a punch 217 adapted to be adjusted by means of a set screw 218 and provided at its lower end with spaced forming portions 219 (see Fig. 21) adapted to engage the sides C of the bail portion of the wire and impress the same, as at F, F, in spaced relation to the transverse portion D to thereby force such transverse portion slightly away from the surface of the paper strip to facilitate the engagement of the wire with the fingernail or suitable tool in the ultimate use of the cap, the raised portion D being within the indentation B of the paper strip so that the wire does not project above the surface of the strip. The strip guide 30 is provided beneath the punch 219 with a hardened block 220.

The support 216 has secured to its other side, by means of a bolt 211, a cylindrical punch 222 adapted to cooperate with a cylindrical die 223 to blank out the circular caps from the strip, this die being spaced from the punch 217 a distance corresponding to the distance between the centers of two caps so that as one completed cap is cut out by the blanking out punch 222 the preceding cap is being operated upon by the punch 217. The cut-out caps are forced through the die 223 where they are ejected from the machine through a shoot 224 into a suitable receptacle.

I have illustrated and described a preferred and satisfactory embodiment of the invention but it will be obvious that changes may be made therein, within the spirit and scope thereof, as defined in the appended claims.

Having thus described my invention what I claim and desire to secure by Letters Patent is:—

1. In a machine of the character described, a wire forming and attaching mechanism for attaching wire bails to cap stock or the like, comprising wire forming means adapted to form lengths of wire into U-shape, means for passing the legs of said formed wire in one direction partially through the stock, means for bending and clinching the inserted ends with respect to the stock, and means for bending the non-inserted portion in flatwise relation to the surface of the stock.

2. In a machine of the character described, wire forming and attaching mechanism for attaching wire bails to cap stock or the like, comprising wire forming means adapted to form lengths of wire into U-shape, means for passing the legs of said formed wire in one direction partially through the stock, means for bending and clinching the inserted ends with respect to the stock, and means for bending the non-inserted portion in flatwise relation to the surface of the stock and whereby the respective leg portions at each side of the stock are aligned.

3. In a machine of the character described, a wire forming and attaching mechanism for attaching wire bails to caps stock or the like comprising wire forming means adapted to form lengths of wire into U-shape, means for passing the legs of said formed wire in one direction partially through the stock, means for bending and clinching the inserted ends with respect to the stock and means for bending the non-inserted portion in flatwise relation to the stock, and whereby the respective leg portions at each side of the stock extend in opposed and aligned relation.

4. In a machine of the character described, a wire forming and attaching means for attaching wire bails to cap stock or the like, comprising wire forming means adapted to form lengths of wire into U-shape, means for passing the legs of said formed wire in one direction partially through the stock, means for bending and clinching the inserted ends with respect to the stock and in parallel relation to each other, and means for bending the non-inserted portion in flatwise relation to the surface of the stock.

5. In a machine of the character described, wire forming and attaching mechanism for attaching wire bails to cap stock or the like, comprising wire forming means adapted to form lengths of wire into U-shape, means for passing the legs of said formed wire in one direction partially through the stock, means for bending and clinching the inserted ends with respect to the stock and in parallel relation to each other, and means for bending the non-inserted portion in flatwise relation to the surface of the stock, the leg portions of said non-inserted portion being parallel and in aligned relation with said bent and clinched portions.

6. In a machine of the character described, a wire forming and attaching mechanism for attaching wire bails to cap stock or the like, comprising wire forming means adapted to form lengths of wire into U-shape, means for passing the legs of said formed wire in one direction partially through the stock, means for bending the end portions of said legs in spaced relation to the stock to form prongs, means for bending the inserted leg portions against the surface of the stock and means whereby said prong ends are passed through the stock in opposed direction to the initial insertion of said legs, and means for flattening the prong ends upon the other surface of the stock.

7. In a machine of the character described, wire forming and attaching means for attaching wire bails to cap stock or the like, comprising wire forming means adapted to form lengths of wire into U-shape, means for passing the legs of said formed wire in one direction partially through the stock, means for bending the end portions of said legs in spaced relation to the stock to form prongs, means for bending the inserted leg portions against the surface of the stock and means whereby said prong ends are passed through the stock in opposed direction to the direction of initial insertion of said legs, and means for flattening said prong ends and said non-inserted portion in the same direction upon the other surface of the stock.

8. In a machine of the character described, a wire forming and attaching mechanism for attaching wire bails to cap stock or the like, comprising wire forming means at the upper side of said stock adapted to form lengths of wire into U-shape, vertically reciprocating means for forcing the legs of said formed wire in one direction partially through the stock, reciprocating means at the under side of the stock for bending the inserted portions of said legs into flatwise relation with the underside of the stock, and horizontally reciprocating means at the upper side of the stock for bending the non-inserted portion of the wire into flatwise relation with the upper surface of the stock and in opposed direction to the bending of said inserted portions.

9. In a machine of the character described, a wire forming and attaching mechanism for attaching wire bails to cap stock or the like, comprising wire forming means at the upper side of the stock adapted to form lengths of wire into U-shape, vertically reciprocating means for passing the legs of said formed wire in one direction partially through the stock, reciprocating means below the surface of the stock for bending the end portions of said legs in spaced relation to the stock to form prongs and for bending the inserted leg portions against the under surface of the stock and means whereby said prong ends are passed upwardly through the stock, and horizontally reciprocating means for flattening said prong ends and the non-inserted portion in the same direction in flatwise relation to the upper surface of the stock.

10. In a machine of the character described, a wire forming and attaching mechanism for attaching wire bails to cap stock or the like comprising wire forming means adapted to form lengths of wire into U-shape and including a vertically disposed slideway, a forming anvil in said slideway, a vertically reciprocating former, means for feeding lengths of wire between said former and said anvil, said former adapted through downward movement to bend the wire about said anvil into U-shape, vertically reciprocating means adapted to force the legs of said formed wire in one direction partially through the stock, means for bending the inserted portions of said wire in flatwise relation to the under surface of stock and means for flattening the non-inserted portion of said wire upon the upper surface of the stock.

11. In a machine of the character described, a wire forming and attaching mechanism for attaching wire bails to cap stock or the like comprising wire forming means adapted to form lengths of wire into U-shape and including a vertically disposed slideway, an anvil adapted to be projected and retracted with relation to the surface of said slideway, a vertically reciprocating former, means for feeding a length of wire between the projected anvil and said former, said former adapted through downward movement in the projected relation of said anvil to bend the wire into U-shape, and vertically reciprocating means adapted in the retracted position of said anvil to force the legs of said formed wire partially through the stock, means at the underside of the stock for bending the inserted portions of the wire in flatwise relation to the underside of the stock and means for flattening the non-inserted portion of said wire upon the upper surface of the stock.

12. In a machine of the character described, a wire forming and attaching mechanism for attaching wire bails to cap stock or the like, comprising wire forming means adapted to form lengths of wire into U-shape and including a vertical slideway, an anvil within said slideway adapted to be projected and retracted with respect to the surface thereof, a stationary anvil portion in spaced and aligned relation below said first mentioned anvil, a vertically reciprocating former, means for feeding a length of wire between the projected anvil and said former, said former adapted through downward movement to bend the wire about said projected anvil to form side leg portions and a transverse portion, vertically reciprocating means adapted in the retracted position of said anvil to force said legs partially through the wire, said wire being limited in its downward movement by engagement of its transverse portion with said stationary anvil, means below the stock adapted to bend the inserted leg portions in flatwise relation to the under surface of the stock and means for flattening the non-inserted portion of said wire upon the upper surface of the stock.

13. In a machine of the character described, a wire forming and attaching mechanism for attaching wire bails to cap stock or the like, comprising wire forming means adapted to form lengths of wire into U-shape and including a vertical slideway, an anvil in said slideway adapted to be projected and retracted with respect to the surface thereof, means for feeding wire at the upper side of said anvil, a vertically reciprocating former, wire cutting means carried by said former and adapted during the initial downward movement to sever a length of wire, said former adapted during the continued downward movement to bend the wire about the projected anvil, vertically reciprocating means adapted in the retracted position of the anvil to force the leg portions of said formed wire partially through the stock, means at the underside of said stock adapted to bend the inserted leg portions in flatwise relation against the underside of the stock and means for flattening the non-inserted portion of said wire upon the upper surface of the stock.

14. In a machine of the character described, wire forming and attaching mechanism for attaching wire bails to cap stock or the like, comprising wire forming means adapted to form lengths of wire into U-shape and including a vertical slideway, an anvil in said slideway adapted to be projected and retracted, means for projecting and retracting said anvil including movable means mounted in relation to said slideway, a vertically reciprocating former, means for feeding a length of wire between said projected anvil and said former, said former adapted through downward movement to bend the wire about said anvil, means carried by said former adapted at the end of said downward movement to engage said movable means to retract said anvil, vertically reciprocating means adapted in the retracted position of said anvil to force the leg portions of said wire partially through the stock, means at the underside of the stock for bending the inserted leg portions in flatwise relation to the under surface of the stock and means for flattening the non-inserted portion of said wire upon the upper surface of the stock.

15. In a machine of the character described, a wire forming and attaching mechanism for attaching wire bails to cap stock or the like, comprising wire forming means adapted to form lengths of wire into U-shape and including a vertical slideway, an anvil in said slideway adapted to be projected and retracted with respect to the surface thereof, a vertically reciprocating former, means for feeding lengths of wire between said anvil and said former, said former adapted through downward movement to bend said wire about said projected anvil, reciprocating means adapted in the retracted position of said anvil to force the legs of said wire partially through the stock, means below the surface of the stock for bending the inserted portions in one direction in flatwise relation against the under surface of the stock, horizontally recprocating means above the surface of the stock adapted to bend the non-inserted portion in opposed relation to the inserted portion and in flatwise relation to the upper surface of the stock and means for flattening the non-inserted portion of said wire upon the upper surface of the stock.

16. In a machine of the character described, a wire forming and attaching mechanism for attaching wire bails to cap stock or the like, comprising wire forming means adapted to form lengths of wire into U-shape and including a vertical slideway, an anvil in said slideway adapted to be projected and retracted with relation to the surface thereof, a stationary anvil in said slideway in spaced and aligned relation below said first anvil, a vertically reciprocating former, means for feeding lengths of wire between said projected anvil and said former, said former adapted through downward movement to bend said wire about said projected anvil and to engage the bent side portions with the sides of said stationary anvil, vertically reciprocating means adapted in the retracted relation of said first anvil to force the legs of said wire partially through the stock, said insertion being limited by engagement of the transverse portion of the wire with said stationary anvil, said stationary anvil and said former adapted to support the non-inserted portion of the wire in vertical relation during the forming operations upon the inserted portions of wire, means at the underside of the stock adapted to bend the inserted portions of the wire in one direction in flatwise relation against the under surface of the stock, and horizontally reciprocating means disposed in relation to said stationary anvil adapted, upon release of the non-inserted portion of the wire through upward movement of the former, to be reciprocated to bend said non-inserted portion in flatwise relation against the upper surface of the stock and in opposed direction to the bending of said inserted portions.

17. In a machine of the character described, a wire forming and attaching mechanism for attaching wire bails to cap stock or the like, comprising wire forming means adapted to form lengths of wire into U-shape and including a vertical slideway, an anvil in said slideway adapted to be projected and retracted with respect to the surface thereof, a stationary anvil in spaced and aligned relation below said first anvil, a reciprocating former, means for feeding lengths of wire between said projected anvil and said former, said former adapted through downward movement to bend the wire about said projected anvil and to engage the sides of said wire with the sides of said stationary anvil, vertically reciprocating means adapted in the retracted relation of said first anvil to force the legs of said wire partially through the stock, said stationary anvil adapted to limit the insertion of said wire, said stationary anvil and said former adapted to support the non-inserted portion of said wire during the forming operations upon the inserted portions of the wire, means at the underside of the stock adapted to bend the end portions of said legs in spaced relation to the stock to form prongs and to bend the inserted leg portions against the under surface of the stock, means whereby said prong ends are passed upwardly through the stock, and horizontally reciprocating means in relation to said stationary anvil adapted upon release of the non-inserted portion of said wire through upward movement of said former to simultaneously clinch said prong ends and bend said non-inserted portion in flatwise relation upon the upper surface of the stock and in the same direction.

18. In a machine of the character described, a wire forming and attaching mechanism for attaching wire bails to cap stock or the like, comprising means at the upper side of the stock for forming lengths of wire into U-shape, means for passing the legs of said formed wire in one direction partially through the stock, wire bending means, at the underside of the stock including slideways disposed in planes at right angles to the plane of said U-shaped wire and adapted to receive said inserted portions of the wire, and reciprocating means engaging said slideways and adapted to simultaneously bend the inserted portions of the wire in flatwise relation against the under surface of the stock.

19. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the under side of the stock including slideways adapted to receive said inserted portions of the wire, said slideway being inclined from the under surface of the stock and a diagonally reciprocating slide engaging said slideway and adapted to be reciprocated to bend said inserted portions of the wire in flatwise relation against the under side of the stock.

20. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the under side of the stock including slideways adapted to receive said inserted portions of the wire, anvil means disposed in said slideways and adapted to be projected and retracted with relation thereto, a reciprocating slide engaging said slideway adapted in the projected relation of said anvil to bend the end portions of the wire about said anvils to form prongs, and in the retracted relation of said anvils to bend the inserted portions of the wire in flatwise relation against the under surface of the stock, means whereby said prong ends are forced upwardly through the stock, and means at the upper side of the stock for clinching said prong ends in flatwise relation to the upper surface of the stock.

21. In a machine of the character described, a wire forming and attaching mechanism for attaching wire bails to cap stock or the like comprising means at the upper side of the stock for forming lengths of wire into U-shape, means for passing the legs of said formed wire partially through the stock, wire bending means on the underside of the stock including parallel slideways disposed in planes at right angles to the plane of said U-shaped wire and adapted to receive the inserted portions of the wire, a reciprocating slide engaged in said slideways and adapted to simultaneously bend the inserted portions of the wire in flatwise relation against the underside of the stock and in parallel relation to each other.

22. In a machine of the character described, a wire forming and attaching mechanism for attaching wire bails to cap stock or the like comprising means at the upper side of the stock for forming lengths of wire into U-shape, means for passing the legs of said formed wire partially through the stock, wire bending means at the underside of the stock including spaced parallel slideways adapted to receive the inserted portions of the wire, means in said slideways for forming prong ends upon the inserted portions of the wire and a reciprocating slide engaging said slideways adapted to bend the inserted portions of the wire in flatwise relation to the under surface of the stock and in parallel relation to each other and means whereby said prong ends are forced upwardly through the stock, and means at the upper side of the stock adapted to clinch said prong ends in flatwise relation to the upper surface of the stock.

23. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the underside of the stock including spaced parallel slideways inclined downwardly from the under surface of the stock, anvil means in relation to each of said slideways adapted to be projected and retracted with relation thereto and having wire forming surfaces inclined in parallel relation to said slideway, a reciprocating slide engaging said slideways adapted in the projected relation of said anvils to bend the ends of said inserted portions of the wire about said inclined wire forming surfaces of the anvils to form prongs extending at an acute angle to the inserted portions of the wire, said reciprocating slide adapted upon retraction of the anvils to bend the inserted portions of the wire in flatwise relation against the under surface of the stock, means whereby said prong ends are forced upwardly through the stock, and means at the upper side of the stock adapted to clinch said prong ends in flatwise relation against the upper surface of the stock.

24. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the underside of the stock including spaced parallel slideways adapted to receive the inserted portion of the wire, anvils in relation to each of said slideways adapted to be projected and retracted, a reciprocating slide including blade members slidably engaged in said slideways and each having a portion adapted during the initial movement of said slide to bend the ends of said inserted portions of the wire about said anvils to form prongs, and portions adapted upon continued movement of the slide and upon retraction of the anvils to bend the inserted portions of the wire in flatwise relation against the under surface of the stock, means whereby said prong ends are forced upwardly through the stock, and means on the upper side of the stock adapted to clinch said prongs in flatwise relation against the upper surface of the stock.

25. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the underside of the stock including spaced parallel slideways adapted to receive the inserted portions of the wire, anvils in relation to each of said slideways adapted to be projected and retracted, said anvils each including a wire forming surface disposed at an angle to the inserted portions of the wire, a reciprocating slide including blade means slidably engaging said slideways and each having a portion parallel to said forming surfaces of the anvils and adapted during the initial movement of said slide to bend the ends of the inserted portions of the wire between said forming surfaces and said surfaces of the blades to form prongs, said blades adapted during the continued movement of the slide and upon retraction of said anvils to bend the inserted portions of the wire against the under surfaces of the stock, and means whereby said prong ends are forced upwardly through the stock, and means at the upper side of the stock adapted to clinch said prong ends in flatwise relation against the upper surface of the stock.

26. In a machine of the character described, a wire forming and attaching mechanism for attaching wire bails to cap stock or the like, comprising means at the upper side of the stock for forming lengths of wire into U-shape, means for passing the legs of said formed wire partially through the stock, wire bending means at the underside of the stock including spaced parallel slideways adapted to receive the inserted portions of the wire, anvils in said slideways adapted to be projected and retracted, a reciprocating slide including means engaging said slideways adapted upon initial movement of said slide to bend the ends of the inserted portions of the wire about said anvils to form prongs, means carried by said slideways adapted upon continued movement of the slide to retract said anvils, said slide adapted upon further continued movement to bend the inserted portions of the wire in flatwise relation against the under surface of the stock, means whereby said prong ends are forced upwardly through the stock, and means at the upper side of the stock adapted to clinch said prong ends in flatwise relation against the upper surface of the stock.

27. In a machine of the character described, wire forming and attaching mechanism for attaching wire bails to closure cap stock or the like comprising wire forming means adapted to form lengths of wire into U-shape, means for passing the legs of said formed wire partially through the stock, means for bending the portions of said legs beneath the stock and means to deflect the end portions toward the underside of the stock, means for inserting the end portions of the legs through the stock a second time, and means for flattening the ends of the wire upon the top surface of the stock.

28. In a machine of the character described, wire forming and attaching mechanism for attaching wire bails to closure cap stock or the like, comprising wire forming means adapted to form lengths of wire into U-shape, means for passing the legs of said formed wire partially through the stock, means for bending the portions of said legs beneath the stock and means to deflect the end portions toward the underside of the stock, means for inserting the end portions of the legs through the stock a second time, means for flattening the ends of the wire upon the top surface of the stock, and means for also flattening the non-inserted portion of said wire upon the top surface of the stock.

29. In a wire forming machine, wire feeding means, a curved tube through which the wire is directed, wire forming means including a longitudinal pocket into which the wire is positioned, a die having a straight opening through which the wire is guided from the tube to the pocket and for holding the wire during the cutting operation, the opening through the die being at an angle with reference to the longitudinal pocket and positioned to deflect the wire into and against the upper side of the pocket for the purpose of straightening the wire blank preparatory to the cutting and forming operation.

Signed at Bridgeport in the county of Fairfield and State of Connecticut this 10th day of April A. D. 1925.

FREDERIC K. PLYMPTON.